United States Patent

Watanabe et al.

[11] Patent Number: 5,804,354
[45] Date of Patent: Sep. 8, 1998

[54] COMPOSITION FOR FORMING CONDUCTIVITY IMPARTING AGENT AND PATTERN FORMING METHOD

[75] Inventors: Keiji Watanabe; Yasuhiro Yoneda; Takashi Maruyama; Keiko Yano, all of Kawasaki; Tomio Nakamura, Yokohama; Shigeru Shimizu, Yokohama; Takashi Saitoh, Yokohama; Takahisa Namiki, Kawasaki; Ei Yano, Kawasaki; Miwa Igarashi, Kawasaki; Yoko Kuramitsu, Kawasaki, all of Japan

[73] Assignees: Fujitsu Limited, Kawasaki; Nitto Chemical Industry Co., Ltd., Tokyo, both of Japan

[21] Appl. No.: 876,794

[22] Filed: Jun. 16, 1997

Related U.S. Application Data

[63] Continuation of Ser. No. 279,210, Jul. 22, 1994, abandoned, which is a continuation-in-part of Ser. No. 77,650, Jun. 17, 1993, Pat. No. 5,560,870.

[30] Foreign Application Priority Data

Jun. 17, 1992 [JP] Japan .................................. 4-157953
Dec. 22, 1993 [JP] Japan .................................. 5-324237

[51] Int. Cl.$^6$ ...................................................... G03C 5/00
[52] U.S. Cl. ........................ 430/325; 430/327; 430/330; 430/296; 430/273.1; 430/942
[58] Field of Search .............................. 430/273.1, 296, 430/325, 327, 330, 942

[56] References Cited

U.S. PATENT DOCUMENTS

| | | | |
|---|---|---|---|
| 4,772,421 | 9/1988 | Ikenaga et al. | 252/500 |
| 4,959,180 | 9/1990 | Armes et al. | 252/519 |
| 5,006,278 | 4/1991 | Elsenbaumer | 427/385.5 |
| 5,109,070 | 4/1992 | Epstein et al. | 525/189 |
| 5,115,057 | 5/1992 | Ono et al. | 526/256 |
| 5,198,153 | 3/1993 | Angelopoulos et al. | 252/500 |
| 5,240,644 | 8/1993 | Barry, Jr. et al. | 252/500 |
| 5,272,042 | 12/1993 | Allen et al. | 430/270.1 |

FOREIGN PATENT DOCUMENTS 3-88819 4/1991 Japan .
91/06887 5/1991 Japan .

OTHER PUBLICATIONS

Yano et al., "Polymer Film Coated Electrodes Prepared by Electroxidation of Aniline Derivatives," *The Chemical Society of Japan*, 1985, vol. 6, pp. 1124–1130. (See English language abstract at pp. 1129–1139.).

Angelopoulos et al., "Polyaniline: Solutions, Films and Oxidation State," *Mol. Cryst. Liq. Cryst.*, 1988, vol. 160, pp. 151–163.

Ray et al., "Electrochemistry of Ring–Substituted Polyanilines: Effect of Substituents on Electronic Properties," *Mol. Cryst. Liq. Cryst.*, 1988, vol. 160, p. 221.

Yue et al., "Synthesis of Self–Doped Conducting Polyaniline," *J. Am. Chem. Soc.*, 1990, vol. 112, pp. 2800–2801.

Yue et al., "Effect of Sulfonic Acid Group on Polyaniline Backbone," *J. Am. Chem. Soc.*, 1991, vol. 113, pp. 2665–2671.

Angelopoulos et al., "Pseudo–Protonic Acid Doping" of Polyaniline, Mol. Cryst. Liq. Cryst., 1988 vol. 100, p. 223.

Angeloupolos et al., "Conducting Polyamilines: Discharge Layers for Electron–Beam Lithography", J. Vac. Sci. Technology. Nov./Dec. 1989, pp. 1519–1523.

*Primary Examiner*—Bernard P. Codd
*Attorney, Agent, or Firm*—Staas & Halsey

[57] ABSTRACT

A composition for forming a conductivity imparting agent comprising:

(a) 0.1 to 20 parts by weight of sulfonated polyaniline having a content of a sulfonic acid group of 20 to 80% with respect to an aromatic ring of the sulfonated polyaniline;

(b) 100 parts by weight of a solvent;

(c) 0.01 to 10 parts by weight of an amine and/or quaternary ammonium salt; and (d) 0.001 to 100 parts by weight of at least one kind of a sulfonic acid group-containing component selected from the following (A) and (B);

(A) compounds having a sulfonic acid group; and
(B) polymers having a sulfonic acid group.

3 Claims, No Drawings

COMPOSITION FOR FORMING CONDUCTIVITY IMPARTING AGENT AND PATTERN FORMING METHOD

This application is a continuation of application Ser. No. 08/279,210, filed Jul. 22, 1994, now abandoned, which is a continuation-in-part application of application Ser. No. 08/077,650, filed Jun. 17, 1993, now U.S. Pat. No. 5,560,870, issued Oct. 1, 1996.

BACKGROUND OF THE INVENTION

1. Field of the Invention

This invention relates to a composition for forming a conductivity imparting agent and a pattern formation method using the agent.

2. Description of the Related Art

A chemical amplification resist has recently drawn increased attention as a resist material used in fabricating semiconductor devices and has been thoroughly investigated. A resist of this kind contains a substance which generates an acid upon selective irradiation (hereinafter, simply referred to as "irradiation") by electrolytic dissociating radiation, and this acid causes a reaction in the resist to proceed catalytically. Accordingly, the resist has a high sensitivity, and according to the results of various researches, the resolution has been improved. Attempts are now being made to introduce this resist into an actual process.

However, the chemical amplification resist involves the problem yet to be solved. First, it is often affected by the atmosphere (air) used. The acid that generates in the resist is deactivated by an alkali contamination in the air, so that the reaction does not proceed and the sensitivity falls remarkably. The reaction at the surface of an exposed portion does not proceed and, for this reason, the drop of resolution is considerable. In the chemical amplification resist, baking is carried out after exposure in order to supply energy for the catalytic reaction by the acid, but the resist is often affected by the alkali in the air, particularly during the period of exposure to baking, and this baking causes unstable performance.

To solve this problem, the following two methods are available at present. The first method forms a nonpolar organic polymer film (polyolefin) on the resist and cuts off contact between the film and the atmosphere, and the second method applies a mixture prepared by adding an acid to a water-soluble polymer (polyvinyl alcohol, etc.) and cuts off the contact of the polymer with the atmosphere so that the acid of the resist surface portion can be supplemented and the alkali from the atmosphere can be entrapped.

However, because the nonpolar polymer must be removed by a nonpolar solvent before development, the production step becomes more complicated when development is carried out by the use of an aqueous alkali solution or an alcohol.

The water-soluble polymer is free from the problem of the nonpolar polymer because it can be removed by an aqueous alkali solution or an alcohol, but is not yet free from the problems that the reaction is excessive at the resist surface portion due to the acid, resolution drops, that the thickness of the resist film itself decreases and that film thickness control is very difficult. Moreover, because an aqueous solution of a strong acid is applied, counter-measures for the strong acid must be set up inside a plant where the pattern formation process is carried out. Such counter-measures must be taken for coaters, storing bottles, drain hoses, and so forth, and are expensive. The influences of the acid on the devices and wiring materials must be also taken into account, but the amount of addition of the acid cannot be reduced. This is because almost all of the water-soluble polymers such as polyvinyl alcohol are neutral polymers, and if the amount of addition of the acid is decreased, the alkali in the atmosphere would readily enter the resist.

One is likely to believe that the problems described above are only concerned with photolithography method in which the resist has considerable contact with the atmosphere but are irrelevant to charged radiation methods such as electron beam, ion beam, etc, methods by which exposure is effected in vacuum. In practice, however, the resist surface attains a high temperature due to the exposure and the acid of the resist surface evaporates in vacuum, so that the reaction does not proceed on the resist surface portion, and the sensitivity, as well as the resolution, drops. Contact with the atmosphere is unavoidable, too, during baking after exposure. In other words, a resist protective film is necessary when a charged radiation method is used in order to (1) prevent intrusion of the alkali in the atmosphere and (2) prevent evaporation of the acid from inside the resist. Nonetheless, a suitable protective film is not available at present.

The charge-up of the resist must also be taken into account in the case of a charged radiation method. When the resist is exposed by the electron beam, electrons stay in the resist and the resist is negatively charged. Accordingly, the electron beam is deflected or twisted and a pattern error (deviation) occurs. To prevent this problem, a conductivity imparting agent must be applied. It would be ideal if this conductivity imparting agent has also an atmosphere isolating effect as described above. If a coating film for cutting off the atmosphere must be applied in addition to the conductivity imparting agent, on the contrary, the number of process steps increases and the cost of production increases.

Among the conductivity imparting agents known at present, an agent using a TCNQ complex salt cannot be used because the solvent is an organic solvent and the resist is dissolved when this agent is applied. Water-soluble conductivity imparting agents which are free from this problem are a polythiophene type and a sulfonated polyaniline type. The polythiophene type conductivity imparting agent is marketed as "Espacer" from Showa Denko K.K. However, this product has excessively high acidity (pH 2 or below), and has the same problem as the acid added water-soluble polymer described above.

The sulfonated polyaniline-type conductivity imparting agent, which is closely associated with the present invention, is the compound described in Japanese Patent Application No. 4-157953, and is alkaline in a liquid state but becomes weakly acidic when converted to a film because an excess of alkali volatiles. Accordingly, it is an excellent material which does not need counter-measures to avoid strong acid inside the plant (since resist processes have often employed alkali development, counter-measures for alkali are not particularly necessary). When this agent is applied to the chemical amplification type resist, however, a drastic decrease in the sensitivity and a drop in resolution can be observed. It is believed that the alkali in the liquid condition is strongly adsorbed to the resist and deactivates the generated acid after exposure to the charged particle beams, and since acidity of the agent in the film condition is low, the effect of supplementing the acid of the resist surface portion and the effect of the alkali entrapment are low. However, in order to use sulfonated polyaniline as the conductive polymer on conductivity imparting agent, in the form of an aqueous solution, a considerable amount of alkali must be added to the solution so as to increase its solubility in water, and it is difficult to reduce the amount of alkali.

SUMMARY OF THE INVENTION

It is an object of the present invention to provide a composition for forming a conductivity imparting agent which can prevent deactivation of an acid generated after exposure of a chemical amplification type resist and charge-up of the resist due to the accumulated charged particles when pattern formation is effected by exposing the chemical amplification type resist to charged radiation, and a pattern formation method using the composition.

The object described above can be accomplished by a composition according to the present invention which comprises:

(a) 0.1 to 20 parts by weight of sulfonated polyanilines in which the content of the sulfonic acid groups is 20 to 80% with respect to the content of the aromatic ring;

(b) 100 parts by weight of a solvent;

(c) 0.01 to 10 parts by weight of amines and/or quaternary ammonium salts; and (d) 0.001 to 100 parts by weight of at least one of sulfonic acid group-containing component selected from the following (A) and (B);

(A) compounds having a sulfonic acid group; and (B) polymers having a sulfonic acid group.

Various sulfonated polyanilines described in "Nihon Kagaku Kaishi", 1985, 1124, Japanese Unexamined Patent Publications (Kokai) No. 61-197633 and No. 1-301714, J. Am. Chem. Soc., 1990, 112, 2800, WO910688 and U.S. Pat. No. 5,093,439 can be used as the sulfonated polyanilines, as the component (a), that constitute the composition used in the present invention. Although various sulfonated polyanilines prepared by various synthesizing methods can also be used, sulfonated polyanilines obtained by copolymerizing at least one kind of compound selected from the group consisting of aniline, N-alkylaniline and phenylenediamines and o-, m- or/and p-aminobenzenesulfonic acids and further sulfonating the resulting copolymer by a sulfonating agent (described in Japanese Unexamined Patent Publication (Kokai) No. 5-178989), and aniline type conductive polymers having a sulfonic acid group and obtained by copolymerizing at least one kind of compound selected from the group consisting of aniline, N-alkylaniline and phenylenediamine and alkoxy-substituted aminobenzenesulfonic acids (Japanese Patent Application No. 5-48540), can be preferably used.

These sulfonated polyanilines (a) are expressed by the following general formula (1).

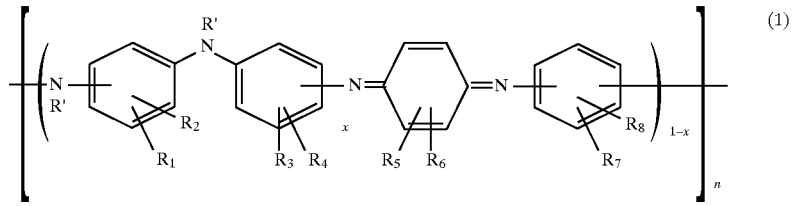

wherein each of $R_1$, $R_2$, $R_3$, $R_4$, $R_5$, $R_6$, $R_7$ and $R_8$ in the formula (1) given above represents hydrogen, a sulfonic acid group, an alkyl group (carbon number 1 to 4) or an alkoxy group (carbon number 1 to 4), R' represents hydrogen or an alkyl group of 1 to 4 carbon atoms, a benzenesulfonic acid group or a benzenecarboxylic acid group and x represents an arbitrary number such that 0<x<1.

The sulfonic acid group content (a) of the sulfonated polyaniline is preferably within the range of 20 to 80% with respect to an aromatic ring, and its molecular weight is preferably from 300 to 500,000 and more preferably, from 500 to 100,000. If the sulfonic acid group content of the sulfonated polyaniline is less than 20%, sufficient conductivity cannot be obtained, and if it exceeds 80%, on the other hand, dissolution characteristics in the solvent drop. If the molecular weight is less than 300, coatability is inferior, and if it exceeds 500,000, solubility in a solvent such as water is low.

The proportion of use of the sulfonated polyaniline component (a) is from 0.1 to 20 parts by weight per 100 parts by weight of the solvent (b) as described above, and is preferably from 0.2 to 15 parts by weight. If the proportion of the component (a) is less than 0.1 parts, pin-holes occur in the film and conductivity is low. If it exceeds 20 parts by weight, on the other hand, a drop in solubility and flatness and gelation of the polymer are observed.

The solvent as the component (b) may be water alone or a mixture of water and an organic solvent.

Examples of the organic solvents to be mixed include alcohols such as methanol, ethanol, propanol, isopropanol, etc, ketones such as acetone, methylisobutyl ketone, etc, cellosolves such as methyl cellosolve, ethyl cellosolve, ethyl cellosolve acetate, etc, and glycols such as methylpropylene glycol, ethylpropylene glycol, etc. Though these solvents can be used by mixing them with water at an arbitrary proportion, they are preferably used in an amount within the range of 0 to 100 parts by weight per 100 parts by weight of water.

Compounds expressed by the following formulas (2) and (3) are used as the amines and/or quaternary ammonium salts as the component (c) of the composition used for the present invention.

The structure of the amines used is expressed by the formula (2).

where $R_1$, $R_2$ and $R_3$ represent mutually and independently hydrogen, an alkyl group of 1 to 4 carbon atoms, and $CH_2OH$, $CH_2CH_2OH$, $CONH_2$ or $NH_2$.

Next, the structural formula of the quaternary ammonium salts used is shown by the formula (3).

where, $R_1$, $R_2$, $R_3$ and $R_4$ represent mutually and independently hydrogen or an alkyl group of 1 to 4 carbon atoms, and $X^-$ is $OH^-$, $\frac{1}{2}SO_4^{2-}$, $NO_3^-$, $\frac{1}{2}CO_3^{2-}$, $HCO_3^-$, $\frac{1}{2}(COO)_2^{2-}$ or $R'COO^-$ (where R' is an alkyl group of 1 to 3 carbon atoms).

The proportion of use of the amines and/or quaternary ammonium salts as the component (c) is from 0.01 to 10 parts by weight, preferably from 0.2 to 10 parts by weight, per 100 parts by weight of the solvent as the component (b), as described already. If the proportion of the component (c)

is less than 0.01 parts by weight, solubility of the component (a) is not sufficient and if it exceeds 10 parts by weight, on the other hand, the solution exhibits strong basicity, and adverse influences such as a drop of conductivity, a drastic decrease of the resist sensitivity, a drop in resolution, etc, occur. By the way, the pH of the solution can be arbitrarily adjusted by the concentration of the amines and/or quaternary ammonium salts, their kinds and their mixing ratio.

The component (d) is at least one member selected from the following (A) a low molecular weight compound containing the sulfonic acid group and (B) a polymer containing the sulfonic acid group, listed below.

(A) Sulfonic acid group-containing compounds are not particularly limited as long as they have a sulfonic acid group in the molecules thereof, and preferred examples are benzenesulfonic acid, alkoxy-substituted benzene-sulfonic acid, alkylbenzenesulfonic acid, alkylsulfonic acid, alpha-olefinalkylsulfonic acid, alkylnaphthalenesulfonic acid, alkylsulfoacetic acid and their salts. Particularly preferred among them are their ammonium salts. Here, the alkyl group preferably has 1 to 24 carbon atoms, and more preferably 3 to 18 carbon atoms. The alkoxy group preferably has 1 to 18 carbon atoms, and more preferably 3 to 12 carbon atoms.

The compounds expressed by the following formula (4) are preferably used as the ammonium salts.

where $R_1$, $R_2$, $R_3$ and $R_4$ represent mutually independently hydrogen or an alkyl group of 1 to 4 carbon atoms.

(B) The polymer containing the sulfonic acid group represents those polymers which contain at least 10% of a repeating unit containing the sulfonic acid group. In other words, the term represents (i) a polymer of at least one kind of monomer selected from the group of monomers containing a sulfonic acid group and (ii) copolymers comprising at least two kinds of monomers selected from (i) the group of monomers containing a sulfonic acid group and (ii) a group of monomers not containing the sulfonic acid group.

Hereinafter, the explanation will be given more concretely.

(i) The monomers containing the sulfonic acid group are not particularly limited as long as they contain the sulfonic acid group in the molecule thereof, and preferred examples include vinylbenzenesulfonic acids such as vinylbenzene-sulfonic acid, allylbenzenesulfonic acid, etc, sulfonated olefins such as allylsulfonic acid, methacrylsulfonic acid, etc, N-sulfoalkylacrylamides such as 2-acrylamidepropanesulfonic acid, 2-acrylamide-2-methylpropanesulfonic acid, 2-acrylamide-n-dodecanesulfonic acid, 4-acrylamidebenzenesulfonic acid, etc, N-sulfoalkylmethacrylamides such as 2-methacrylamidepropanesulfonic acid, 2-methacrylamide-2-methylpropanesulfonic acid, 2-methacrylamide-n-dodecanesulfonic acid, 4-methacrylamidebenzenesulfonic acid, etc, acrylates such as 4-sulfophenyl acrylate, 3-sulfopropyl acrylate, 2-sulfo-2-methylpropyl acrylate, 2-hydroxy-3-sulfopropyl acrylate, etc, methacrylates such as 4-sulfophenyl methacrylate, 3-sulfopropyl methacrylate, 2-sulfo-methylpropyl methacrylate, 2-hydroxy-3-sulfopropyl methacrylate, 2-sulfoethyl methacrylate, etc, and their salts.

(ii) The monomers not containing the sulfonic acid group are not particularly limited as long as they have a double bond capable of copolymerizing with the monomer (i) described above, and preferred examples include acrylates such as methyl acrylate, butyl acrylate, hexyl acrylate, dodecyl acrylate, etc, methacrylates such as methyl methacrylate, ethyl methacrylate, butyl methacrylate, hexyl methacrylate, dodecyl methacrylate, etc, acrylic and methacrylic acids such as acrylic acid, methacrylic acid, 2-butylacrylic acid, etc, styrenes such as styrene, alpha-styrene, etc, acrylamides and methacrylamides such as acrylamide, methacrylamide, N-methylacrylamide, N-ethylacrylamide, N-methyl-acrylamide, N-ethylmethacrylamide, etc, and acrylonitriles and methacrylonitriles such as acrylonitrile, methacrylonitrile, 2-ethylacrylonitrile, etc.

The monomers (i) are used as they are individually polymerized, or two or more kinds of monomers are copolymerized. Alternatively, at least two kinds of monomers selected from the group of the monomers (i) and the group of monomers (ii) are copolymerized and are then used.

Both acid and salt types of the sulfonic acid groups of these copolymers can be used, but the ammonium salts are particularly preferred. The compounds expressed by the formula (4) are preferably used as the ammonium salts.

The proportion of the group of monomers (i) is at least 10% and more preferably at least 20%.

The molecular weight of (B) is preferably from 300 to 200,000 and more preferably 500 to 100,000.

The proportion of use of the component (d) is from 0.001 to 100 parts by weight, preferably from 0.02 to 50 parts by weight and further preferably, from 1 to 10 parts by weight, on the basis of 100 parts by weight of the solvent (b), as already described. If the proportion of the component (d) is less than 0.001 part by weight, the acid trap effect is not sufficient and if it exceeds 100 parts by weight, the adverse influence of the drop of contrast occurs.

The pH of the composition is from 5 to 12, and preferably from 7 to 10. If the pH is less than 5, the resist surface portion reacts, so that the contrast drops. If it exceeds 12, the acid generated in the resist by exposure is deactivated and the sensitivity drops.

Further, the composition according to the present invention may contain a surface active agent, a preservation stabilizer, a bonding adjuvant, etc, whenever necessary.

The above explains the composition of the conductivity imparting agent to be applied to the resist. It has been found out that in order to fully exploit the effects of improving the sensitivity and resolution of the chemical amplification resist, as the resist protective film, high temperature baking after applying the chemical amplification resist and high temperature baking after the application of the sulfonated polyaniline composition (composition for forming the conductivity imparting agent) are important.

In this way, the present invention provides a pattern formation method which includes the steps of applicating a chemical amplification resist, baking the applied resist at a temperature of not lower than 110° C., preferably not lower than 120° C., applying the sulfonated polyaniline type composition for forming the conductivity imparting agent on the baked resist, baking the composition and the resist at a temperature of not lower than 110° C., preferably not lower than 120° C., so as to form a conductor layer on the resist, irradiating the conductor layer and the resist with a charged radiation ray, particularly an electron beam or a converged ion beam, and effecting development of the resist and the conductor layer by an aqueous alkali solution or an alcohol.

High temperature baking of the resist makes the resist film compact, and alkali in the sulfonated polyaniline solution cannot easily enter the resist film. Complete removal of the solvent, too, is important for preventing intrusion of the alkali. When high temperature baking is effected after coating of the sulfonated polyaniline solution, the alkali in the sulfonated polyaniline solution is completely removed, and sulfonated polyaniline containing the sulfonic acid group component (d) remains. This film becomes compact due to high temperature baking, and has high air cutoff effect. Moreover, the sulfonic acid group-containing component (d) in sulfonated polyaniline traps the alkali that would otherwise enter the film.

This sulfonated polyaniline has an excellent effect as an antielectrostatic agent, i.e., electrostatic charge-preventing agent as already described, and the electrostatic charge-up preventing effect as well as the alkali cutoff effect can be obtained simultaneously.

The present invention is effective for both negative and positive tone resists so long as the resist is a chemical amplification tone resist, and is not particularly limited to the tone of the resist. However, the present invention provides a particularly large effect for the positive tone resist.

The construction of the chemical amplification tone resist generally comprises a base polymer, a cross-linking agent and an photo acid generator. This resist includes the negative tone resist wherein the acid that generates by exposure acts as a catalyst and cross-linkage proceeds. On the other hand, the positive tone resist comprises a base polymer, and an photo acid generator, wherein the photo acid generated by exposure acts as a catalyst, decomposes the base polymer, and renders it soluble in the developer. Typical examples of such chemical amplification tone resists are described in SPIE, Vol. 923, Electron-Beam, X-ray, and Ion-Beam Technology: Submicrometer Lithographies VII, 1988, p158–171 (negative tone), and SPIE, Vol, 1086, Advances, in Resist Technology and Processing VI (1989), p2–10 (positive tone).

In a preferred embodiment of the present invention, a chemical amplification tone resist containing a copolymer between tert-butoxycarbonyloxystyrene and hydroxystyrene and expressed by the following formula is used.

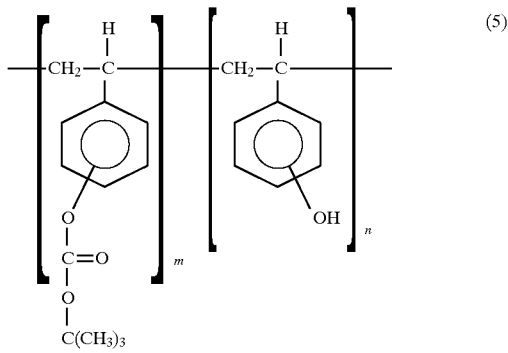

When baking of the resist of sulfonated polyaniline at a temperature of less than 110° C. in the case of the copolymer of tert-butoxycarbonyloxystyrene and hydroxystyrene, a drop in both resist sensitivity and resolution is observed. Accordingly, when this resist is used, baking is preferably carried out at a temperature not lower than 110° C., preferably not lower than 120° C. In the case of this resist, remarkable degradation of resolution can be observed at 130° C. (which presumably results from cutoff of the tert-butoxycarbonyloxy group by heat). Therefore, baking is most preferably carried out at a temperature within the range of 115° to 125° C.

The copolymerization ratio between tert-butoxycarbonyloxystyrene and hydroxystyrene is preferably between 1:19 and 1:1 and is particularly preferably between 1:9 and 3:7. If the amount of tert-butoxycarbonyloxystyrene is smaller than the ratio 1:19, reduction of the film occurs due to development and the contrast of the resist drops. If it is higher than the ratio 1:1, the resist is likely to change to the negative tone, and contrast drops, too. The sulfonic acid group-containing component (d) contained in the conductivity imparting agent at this time preferably has 3 to 20 carbon atoms in the alkyl group thereof, whether the component (d) is alkylbenzenesulfonic acid or alkylsulfonic acid. The concentration of the acid is particularly preferably between 0.001 and 0.1 part by weight on the basis of 100 parts by weight of the solvent.

The term "baking" hereby used means baking which is directed to evaporate the solvent and to solidify the film after the application of the resist and after the application of sulfonated polyaniline, but does not include baking which is effected so as to promote the reaction after the acid is generated by exposure. Caution must be paid to this point. The present invention does not at all stipulate the baking temperature after exposure, and a temperature providing the highest resist sensitivity and resolution can be freely selected.

Exposure and development can be carried out in a customary manner.

EXAMPLES

Example 1

A resist prepared by dissolving 1 g of a copolymer (having Mw of about 5,000) of tert-butoxycarbonyloxystyrene and hydroxystyrene=2:8 and 0.05 g of triphenylsulfoniumtriflate ($Ph_3S^+CF_3SO_3^-$) in 6 g of ethyl lactate was coated to a silicon wafer to a film thickness of 0.6 $\mu$m.

Thereafter, the resist was pre-baked for 2 minutes, and a sulfonated polyaniline solution was further coated to a film thickness of 0.05 $\mu$m. Baking was further effected for one minute to obtain a sample. The composition of the sulfonated polyaniline solution was as follows:

| | |
|---|---:|
| sulfonated polyaniline | 5 parts |
| (40% sulfonic acid group content to aromatic ring) | |
| water (solvent) | 100 parts |
| dimethylethylamine | 5 parts |
| dodecylbenzenesulfonic acid | shown in table |

TABLE 1

| bake temp. for resist | bake temp. for polyaniline | acid amount | optimum exposure ($\mu C/cm^2$) | resolution | remarks |
|---|---|---|---|---|---|
| 130° C. | 130° C. | 10 parts | 5.1 | Δ | remarkable drop of contrast |
| 120° C. | 120° C. | | 7.1 | ⊚ | top data, rectangle up to 0.2 $\mu$m |
| 110° C. | 120° C. | | 6.5 | ○ | inverted triangular pattern |

TABLE 1-continued

| bake temp. for resist | bake temp. for polyaniline | acid amount | optimum exposure ($\mu C/cm^2$) | resolution | remarks |
|---|---|---|---|---|---|
| 120° C. | 110° C. | | 6.5 | ○ | |
| 110° C. | 110° C. | | 9 | Δ | inverted triangular pattern |
| 100° C. | 100° C. | | 11 | X | extremely inverted triangular pattern |
| 90° C. | 90° C. | | — | X | no resolution at all |
| 120° C. | 120° C. | 30 parts | 7 | ○ | inverted triangular pattern |
| 110° C. | 120° C. | | 6.5 | ○ | |
| 120° C. | 110° C. | | 6.5 | Δ | drop of contrast |
| 110° C. | 110° C. | | 9 | Δ | drop of contrast |
| 100° C. | 100° C. | | 11 | X | extremely inverted triangular pattern |
| 90° C. | 90° C. | | — | X | no resolution at all |
| 120° C. | 120° C. | 0.01 parts | 7.1 | Δ | inverted triangular pattern |
| 110° C. | 120° C. | | 7.1 | Δ | |
| 120° C. | 110° C. | | 7.1 | ○ | |
| 110° C. | 110° C. | | 8 | Δ | drop of contrast |
| 100° C. | 100° C. | | 11 | X | extremely inverted triangular pattern |
| 90° C. | 90° C. | | — | X | no resolution at all |
| 120° C. | 120° C. | nil | — | X | |
| 110° C. | 120° C. | | — | X | |
| 120° C. | 110° C. | | — | X | no resolution at all |
| 110° C. | 110° C. | | — | X | |
| 100° C. | 100° C. | | — | X | |

Resolution judgement: x = poor, Δ = fair, ○ = good, ⊙ = very good
○ or ⊙ provided resolution into substantial rectangle up to 0.2 $\mu$ml/s The following could be understood from the data given above:

(i) A baking temperature of not lower than 100° C. was suitable for baking both the resist and sulfonated polyaniline.

(ii) An optimum value existed for the amount of addition of the acid.

Accordingly, it could be understood that the use of an optimum value for the baking temperature was important. Further, when the sample was left standing in the atmosphere for one hour after exposure, both sensitivity and resolution were stable. It could also be understood from this fact that the sulfonated polyaniline film protected the resist and prevented intrusion of the alkali from the atmosphere.

When similar evaluation was made by using a polymer having 15% sulfonic acid group content of sulfonated polyaniline, the sensitivity and resolution of the resist could be improved, but conductivity was so low that the film could not be used as the antielectrostatic film or electrostatic charge preventing film. In the case of a polymer having 90% sulfonic acid group content with respect to aromatic ring of the sulfonated polyaniline, uniformity of the film at the time of coating was extremely low. This was presumably because solubility of this sulfonated polyaniline in the solvent was low from the beginning.

When N,N'-dimethylethylamine was not added, coatability of the conductor film was low, and when 20 parts of the compound was added, removable of the alkali by baking did not sufficiently proceed, so that resolution was extremely low.

Example 2

A composition of a sulfonated polyaniline solution, having the composition listed below, was evaluated in the same way as in Example 1.

| | |
|---|---|
| sulfonated polyaniline | 5 parts |
| (60% sulfonic acid group content to aromatic ring) | |
| water (solvent) | 100 parts |
| N,N'-dimethylethylamine | 5 parts |
| poly-2-acrylamidepropanesulfonic acid (mean molecular weight = 6,400) | shown in table |

TABLE 2

| bake temp. for resist | bake temp. for polyaniline | acid addition (solvent 100) | optimum exposure ($\mu C/cm^2$) | resolution | remarks |
|---|---|---|---|---|---|
| 130° C. | 130° C. | 10 parts | 6.1 | Δ | remarkable drop of contrast |
| 120° C. | 120° C. | | 7.3 | ⊙ | top data |
| 110° C. | 120° C. | | 6.4 | ○ | inverted triangular pattern |
| 120° C. | 110° C. | | 7 | ○ | |
| 110° C. | 110° C. | | 9 | Δ | |
| 100° C. | 100° C. | | 13 | X | |
| 120° C. | 120° C. | 30 parts | 7 | ○ | |
| 110° C. | 120° C. | | 7.5 | ○ | |
| 120° C. | 110° C. | | 7.5 | ○ | |
| 110° C. | 110° C. | | 10 | ○ | |

TABLE 2-continued

| bake temp. for resist | bake temp. for polyaniline | acid addition (solvent 100) | optimum exposure ($\mu C/cm^2$) | resolution | remarks |
|---|---|---|---|---|---|
| 100° C. | 100° C. | | 15 | X | extremely inverted triangular pattern |
| 120° C. | 120° C. | 0.01 parts | 10 | ○ | |
| 110° C. | 120° C. | | 10 | ○ | |
| 120° C. | 110° C. | | 11 | ○ | |
| 110° C. | 110° C. | | 11 | Δ | drop of contrast |
| 100° C. | 100° C. | | 11 | X | extremely inverted triangular pattern |
| 120° C. | 120° C. | nil | — | X | |
| 110° C. | 120° C. | | — | X | |
| 120° C. | 110° C. | | — | X | no resolution at all |
| 110° C. | 110° C. | | — | X | |
| 100° C. | 100° C. | | — | X | |

Resolution: x = poor, Δ = fair, ○ = good, ◉ = very good

It could also be understood that a baking temperature of not lower than 110° C. was suitable for both of the resist and sulfonated polyaniline. When the sample was left standing in the atmosphere for one hour after exposure, both sensitivity and resolution were stable. It could be understood from this fact that sulfonated polyaniline containing a polymer having a sulfonic acid group could also be used.

Example 3

A composition of a sulfonated polyaniline solution, having the composition listed below, was evaluated in the same way as in Example 1.

| | |
|---|---|
| sulfonated polyaniline | 5 parts |
| (60% sulfonic acid group content to aromatic ring) | |
| water (solvent) | 100 parts |
| dimethylethylamine acetate | 5 parts |
| dodecylbenzenesulfonic acid | 5 parts |

As a result, high resolution could be obtained at a baking temperature of not lower than 110° C., and resolution of 0.2 $\mu$ml/s (line/space) could resolve with a good profile. It could be understood from this fact that sulfonated polyaniline, to which a quaternary ammonium salt was added, could be also used.

Data obtained by examining the negative type are partly given below.

Example 4

A composition of a sulfonated polyaniline solution was prepared for a negative type resist SAL-601 of Shipley Co., as listed below, and was evaluated in the same way as in Example 1.

| | |
|---|---|
| sulfonated polyaniline | 5 parts |
| (sulfonic acid group content of 60% to aromatic ring) | |
| water (solvent) | 100 parts |
| dimethylethylamine | 5 parts |
| poly-2-acrylamidepropanesulfonic acid (mean molecular weight 6,400) | 5 parts |

As a result, the highest resolution could be obtained at a baking temperature within the range of 120° to 140° C. The pattern profile became rectangler than when sulfonated polyaniline not containing the sulfonic acid group component (d) was applied. Further, even when the sample was left standing for one hour in the atmosphere after exposure, both sensitivity and resolution were stable. It could be understood from this fact that coating of the conductivity imparting agent according to the present invention was effective for the chemical amplification negative tone resist.

When the chemical amplification resist is exposed by the charged particle beam radiation, the present invention forms the suitable conductor layer on the resist, bakes both the resist and the conductor forming layer at a high temperature so as to prevent a position error of the pattern due to the charge accumulation, and can form a high resolution pattern because deactivation of the resist does not occur.

We claim:

1. A pattern formation method comprising the steps of:
   applying a chemical amplification resist;
   baking the applied resist at a temperature not lower than 110° C.;
   applying a composition on said resist, said composition comprising:
   (a) 0.1 to 20 parts by weight of a sulfonated polyaniline, the number of sulfonic acid groups in the sulfonated polyaniline being 20 to 80% of the number of aromatic rings in the sulfonated polyaniline, the sulfonated polyaniline being a compound represented by the following formula:

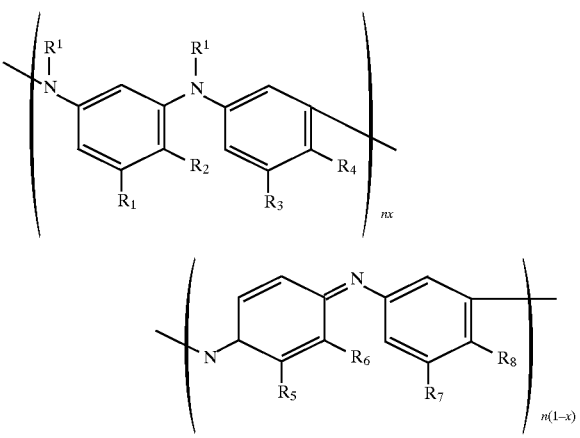

where $R_1$ through $R_8$ each independently represent one of a hydrogen atom, a sulfonic acid group, an alkyl group having 1–4 carbon atoms and an alkoxy group having 1–4 carbon atoms; R' represents one of a hydrogen atom, an alkyl group having 1–4 carbon atoms, a benzenesulfonic acid group and a benzenecarboxylic acid group; and x represents a number such that $0<x<1$;
   (b) 100 parts by weight of a solvent;
   (c) 0.01 to 10 parts by weight of an amine and/or quaternary ammonium salt; and (d) 0.001 to 100 parts by weight of at least one kind of a sulfonic acid group-containing component, the sulfonic acid group containing component being selected from the following (A) and (B);

(A) compounds having a sulfonic acid group selected from the group consisting of benzenesulfonic acid, alkoxysubstituted benzene-sulfonic acid, alkylbenzenesulfonic acid, alkylsulfonic acid, alpha-olefinalkylsulfonic acid, alkylnapthalenesulfonic acid, alkylsulfoacetic acid, salts of benzenesulfonic acid, salts of alkoxysubstituted benzenesulfonic acid, salts of alkylbenzenesulfonic acid, salts of alkylsulfonic acid, salts of alpha-olefinalkylsulfonic acid, salts of alkylnapthalenesulfonic acid, salts of alkylsulfoacetic acid; and (B) polymers having a sulfonic acid group selected from the group consisting of polymers formed from at least one kind of sulfonic acid group containing monomer and copolymers formed from at least a sulfonic acid group containing monomer and a monomer not containing a sulfonic acid group, the sulfonic acid group containing monomers being selected from the group consisting of vinylbenzenesulfonic acids, sulfonated olefins, N-sulfoalkylacrylamides, N-sulfoalkylmethacrylamides, sulfonic acid group containing acrylates, sulfonic acid group containing methacrylates, salts of vinylbenzenesulfonic acids, salts of sulfonated olefins, salts of N-sulfoalkylacrylamides, salts of N-sulfoalkylmethacrylamides, salts of sulfonic acid group containing acrylates and salts of sulfonic acid group containing methacrylates;

further baking said resist and said composition at a temperature not lower than 110° C.;

selectively irradiating said resist and said composition with charged radiation; and developing said resist and said composition with an aqueous alkali solution or an alcohol.

2. A pattern formation method according to claim 1, which uses a chemical amplification resist containing a copolymer of tertiarybutoxycarbonyloxystyrene and hydroxystyrene.

3. A pattern formation method according to claim 2, wherein a polymerization ratio between tertiarybutoxycarbonyloxystyrene and hydroxystyrene of said copolymer is within the range of 1:19 to 1:1.

* * * * *

UNITED STATES PATENT AND TRADEMARK OFFICE
CERTIFICATE OF CORRECTION

PATENT NO.: 5,804,354
DATED : September 8, 1998
INVENTOR(S): Keiji WATANABE et al.

It is certified that error appears in the above-identified patent and that said Letters Patent is hereby corrected as shown below:

Title page, [63], and in column 1 the "Related U.S. Application Data", please change "Patent No. 5,560,870" to --abandoned--.

Signed and Sealed this

Eleventh Day of May, 1999

Attest:

Q. TODD DICKINSON

*Attesting Officer*  *Acting Commissioner of Patents and Trademarks*